J. W. Hardie,
Knife and Fork.

Nº 33,703.   Patented Nov. 12, 1861.

Witnesses:
B. G. Owen
D. Franklin Jones

Inventor:
J. W. Hardie,
By his atty.
J. S. Brown.

UNITED STATES PATENT OFFICE.

J. W. HARDIE, OF NEW YORK, N. Y.

IMPROVED CONSTRUCTION OF KNIVES AND FORKS.

Specification forming part of Letters Patent No. 33,703, dated November 12, 1861.

*To all whom it may concern:*

Be it known that I, J. W. HARDIE, of New York, in the county of New York and State of New York, have invented a new and useful Improvement in Constructing Table Knives and Forks; and I do hereby declare that the following is a full and exact description thereof, reference being had to the accompanying drawings, making part of this specification.

Figure 1:
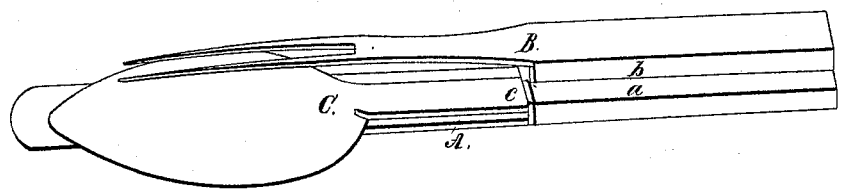
Figure 2:
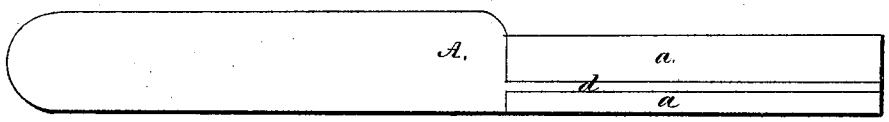
Figure 3:
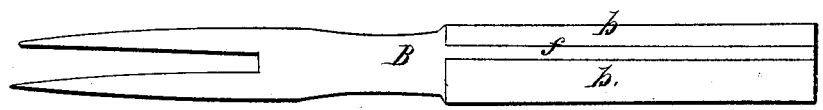
Figure 4:
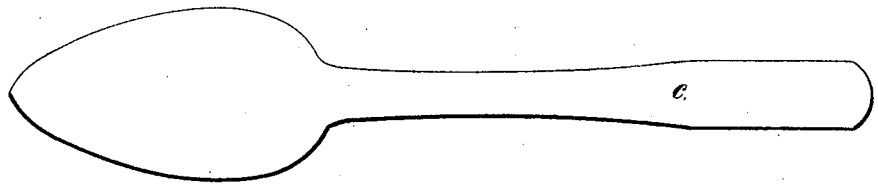
Figure 5:
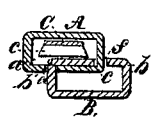

Figure 1 is a view in perspective of a knife and fork of my improved construction packed together in connection with a spoon, for transportation; Fig. 2, a side view of the knife separate; Fig. 3, a side or front view of the fork separate; Fig. 4, a side or back view of a spoon adapted to packing with the improved knife and fork; Fig. 5, a cross-section of the handles of all when packed together, as in Fig. 1, showing the way in which the parts are bound together.

Like letters designate corresponding parts in all of the figures.

The object of my invention is to produce table knives and forks especially adapted to soldiers' and travelers' use, as well as superior to other knives and forks for kitchen use, or for any purpose wherein cheapness, strength, and durability are required.

Each knife A is made of a single piece of sheet-steel, both handle and blade. To effect this a piece of the sheet-steel is cut out, of the exact shape required. Then the portion which is to form the handle is swaged into the width, thickness, and shape of an ordinary knife-handle, as represented, the two edges $a\ a$ of the metal approaching each other in the same plane, but leaving a narrow space $d$ the whole length between them, for the purposes hereinafter specified. The handle is so formed that one edge shall be even with the back edge of the blade, while the cutting-edge of the blade extends out beyond the other edge of the handle in the usual manner, so that in general the handle appears in size, position, and shape like the ordinary knife-handle, except that it is all at one side of the blade. The cutting-edge of the blade is then ground to the required thinness and the knife is finished.

Each fork B is also made of a single piece of sheet-steel cut out in the proper shape, and the handle swaged into the ordinary form just as the knife-handle is formed. The two edges $b\ b$ of the metal also approach without meeting each other, but having a narrow opening $f$ the whole length between them. The edges of the handle project equally on both edges of the fork, but the handle is all on the front side thereof. The tines and shank are then bent into form and the fork is finished.

One of the purposes of the apertures $d\ f$ in the handles of the knife and fork is to enable a part of one handle to be slipped inside of the other, and thus to lock them together for closely packing and transportation. To do this the aperture $d$ in the knife-handle is near to the back edge thereof, while the aperture $f$ in the fork-handle is also near to one edge, so as to bring the tines of the fork centrally over the blade of the knife. They are packed together as shown in Figs. 1 and 5, one edge of one handle entering the aperture in the other handle. The apertures are just wide enough for this purpose. The openings $d\ f$ in the handles of the knife and fork also serve to admit a wiping-cloth inside of the handles for keeping the same clean. The handles may be japanned inside and outside to prevent rusting. Thus this mode of constructing the handles insures readiness and cheapness of construction with the best of materials for sharpness of edge and durability, the handles never coming off like other knife and fork handles. They also, having the usual form and all sides inclosed except the narrow apertures $d\ f$, as well as being smooth, offer all the advantages of any handles in use with the additional ones, above enumerated. These qualities commend them for all common and hard uses. There is also sufficient room between the knife and fork when packed together for the insertion of a spoon C by having the handle $c$ thereof narrow enough, as shown in Fig. 4, to enter that of the knife beneath the fork-handle; and since the handle and bowl of the spoon are of curved form and generally more or less elastic, it serves thus to bind the knife and fork more securely together, the bowl of the spoon lying under the curved fork-tines. The three utensils are thus very compactly united and become very convenient for traveling and camp use.

What I claim as my invention, and desire to secure by Letters Patent, is—

Forming the knife handle and blade and the fork handle and tines, respectively, out of a single piece of sheet-steel when the handles are formed thereby in the usual shape and proportions of other knife and fork handles and nearly inclose all sides, leaving only narrow apertures $d\,f$ therein for the purpose of closely packing together and for readily cleaning, as a new article of manufacture, substantially as herein specified.

In witness that the above is a true specification of my improvement in constructing table knives and forks for camp and travelers' use, I hereunto set my hand this 4th day of October, 1861.

J. W. HARDIE.

Witnesses:
    A. S. HAYWARD,
    WM. LEE.